United States Patent [19]

Murray

[11] 3,995,472
[45] Dec. 7, 1976

[54] DETECTOR SYSTEM
[75] Inventor: James T. Murray, Brooklyn, N.Y.
[73] Assignee: Murgor Electric Company, Inc., Brooklyn, N.Y.
[22] Filed: June 26, 1975
[21] Appl. No.: 590,487
[52] U.S. Cl. .................................. 73/40; 73/49.2; 340/242; 116/114 P
[51] Int. Cl.[2] ........................................ F17D 3/04
[58] Field of Search ............... 73/40, 40.5 R, 40.7, 73/49.2, 49.3; 116/114 P; 340/242

[56] References Cited
UNITED STATES PATENTS

| 3,564,526 | 2/1971 | Butts ................................ 340/242 |
| 3,720,797 | 3/1973 | Gunn et al. ..................... 340/242 X |
| 3,721,898 | 3/1973 | Dragoumis et al. ........... 340/242 X |

FOREIGN PATENTS OR APPLICATIONS

| 1,910,166 | 9/1970 | Germany ............................... 73/40 |
| 1,084,092 | 6/1960 | Germany ........................... 340/242 |
| 2,012,445 | 10/1971 | Germany ........................... 340/242 |
| 1,106,935 | 3/1968 | United Kingdom ............... 340/242 |

Primary Examiner—Richard C. Queisser
Assistant Examiner—Joseph W. Roskos

[57] ABSTRACT

A system to detect leaks, monitor levels, activate alarms, etc. in which a specific material in the system dissolves or disintegrates on contact with a liquid, gas or vapor which is to be monitored.

1 Claim, 6 Drawing Figures

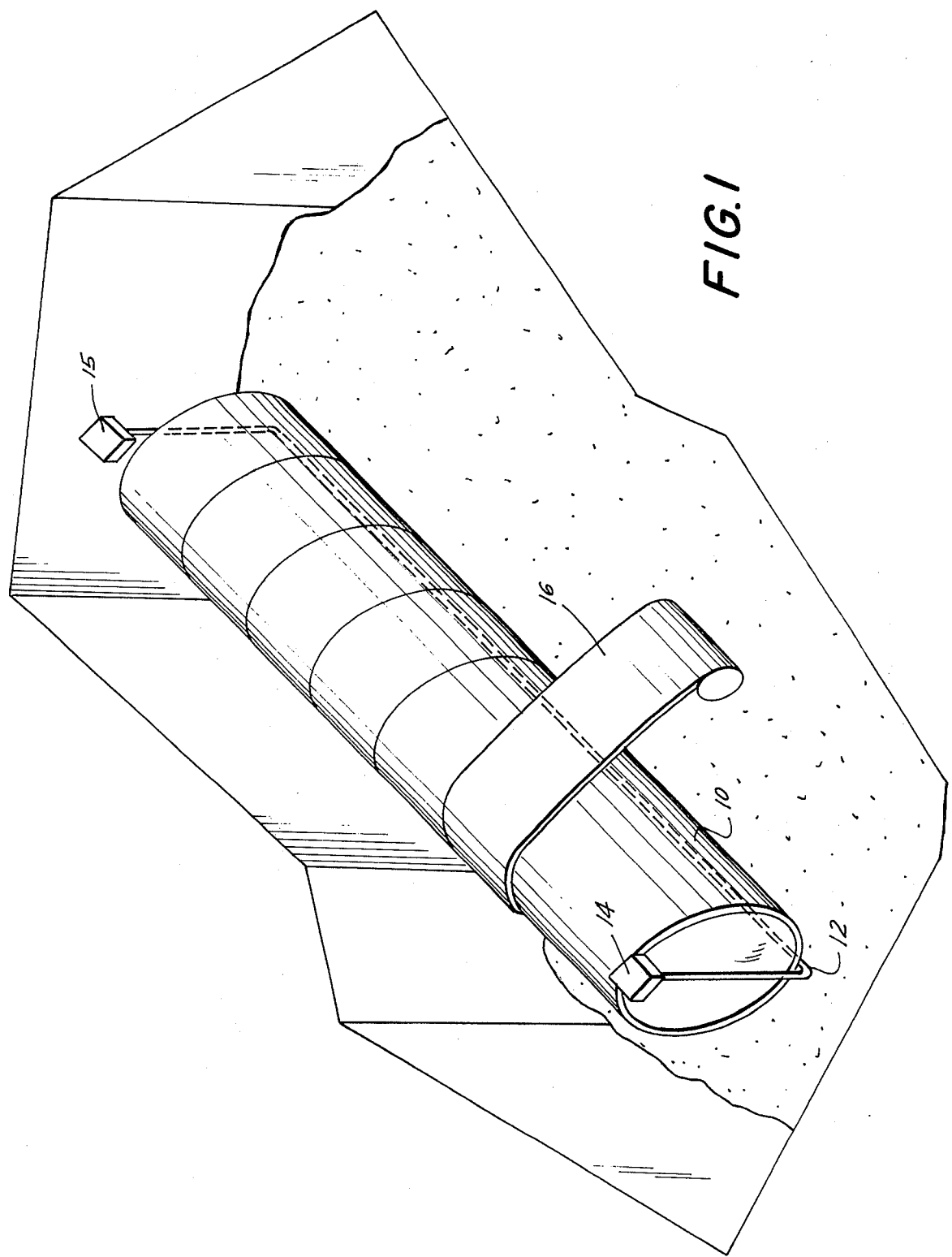

DETECTOR SYSTEM

BACKGROUND OF THE INVENTION

There are many instances in today's commerce when it is necessary to immediately detect leakages in tanks which contain materials such as underground gasoline tanks or any other tank containing liquid which are in locations that are not readily accessible or visible. Also it is frequently necessary even though the tanks may be readily available, to detect leakage immediately and energize various systems to prevent fire and other hazards.

SUMMARY OF THE INVENTION

A detector system for monitoring material such as liquids, vapors and gas within a tank comprising the tank containing the material, a hose in operative association with said tank, said hose being sensitive to said material whereby contact therewith renders the interior of the hose open to atmosphere, an alarm system, a pressurized component of said alarm system in normally operating condition, an alarm responsive to depressurization of said pressurized component, said hose being in operative association with said pressurized component whereby exposure of the interior of said hose to atmosphere results in the depressurization of the pressurized component and activation of said alarm.

DESCRIPTION OF THE DRAWINGS

FIG. 1 is a perspective view of a tank equipped with a leak detector which is constructed in accordance with the teachings of this invention with the wrap member partially moved for illustrative purposes;

DESCRIPTION OF THE PREFERRED EMBODIMENT

Figure 3:
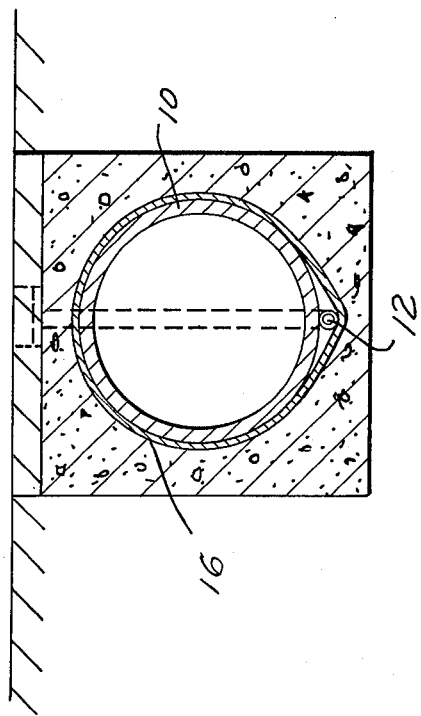
FIG. 3 is a sectional view taken along the line 3—3 in the direction of the arrows in FIG. 2.
Figure 2:
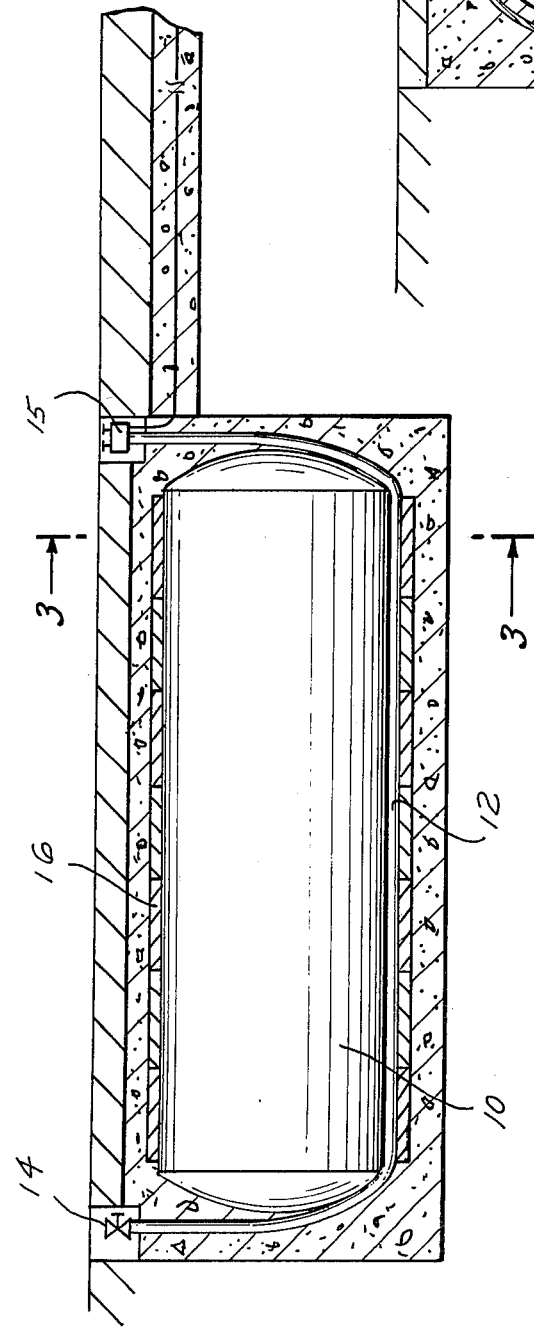
FIG. 2 is partially sectional view of the tank of FIG. 1 installed.
Figure 4:
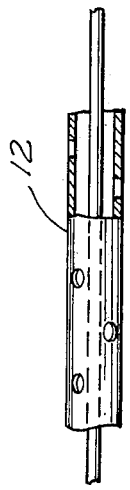
FIG. 4 is a detailed view of the destructible hose used in the invention.

In the drawings the numeral 10 designates a tank which in the installation shown in FIG. 1 is beneath ground. The tank has a hose 12 attached thereto at one end at junction box 14 and which extends beneath the cylindrical tank 10 and which is attached at the remaining end to junction box 15. The cylindrical tank is wrapped with a plastic wrap 16 which for illustrative purposes in FIG. 1 is shown partially removed. With this arrangement any leak in the tank 10 will result in the fluid leaking therefrom finding its way into contact with hose 12.

The hose is part of a larger system which includes line 20, check valve 22, holding tank 24 and gate valve 26 which allows a source of pressure such as a pressurized container or compressor to be introduced into the system.

A "T" connection 28 is provided between the holding tank and valve 22 and this allows normally open pressure switch 30 to be entered into the system via line 32.

Contacts 34 of the pressure switch 30 can be utilized to connect to an outside system which would indicate pressure or non-pressure in the system. The remaining contacts 36 are connected to control wires 38 and 40. A push-button reset 42 is provided in line 40 and the line is connected to contact 44 with electrical connector 46. Line 38 is connected to contact 48 thereof and connector 46 is grounded at 50. A warning light 52 and horn 54 are connected across lines 38 and 40 and a relay 56 is inserted in line 40 for purpose as will be explained below.

In this system the gate valve 26 allows the system to be pressurized, holding tank 24 is provided to trap and save for leaks during startup. Track valve 22 is utilized to prevent leaks back into the control and junction boxes are provided as necessary so that hoses can be replaced as worn.

Figure 5:
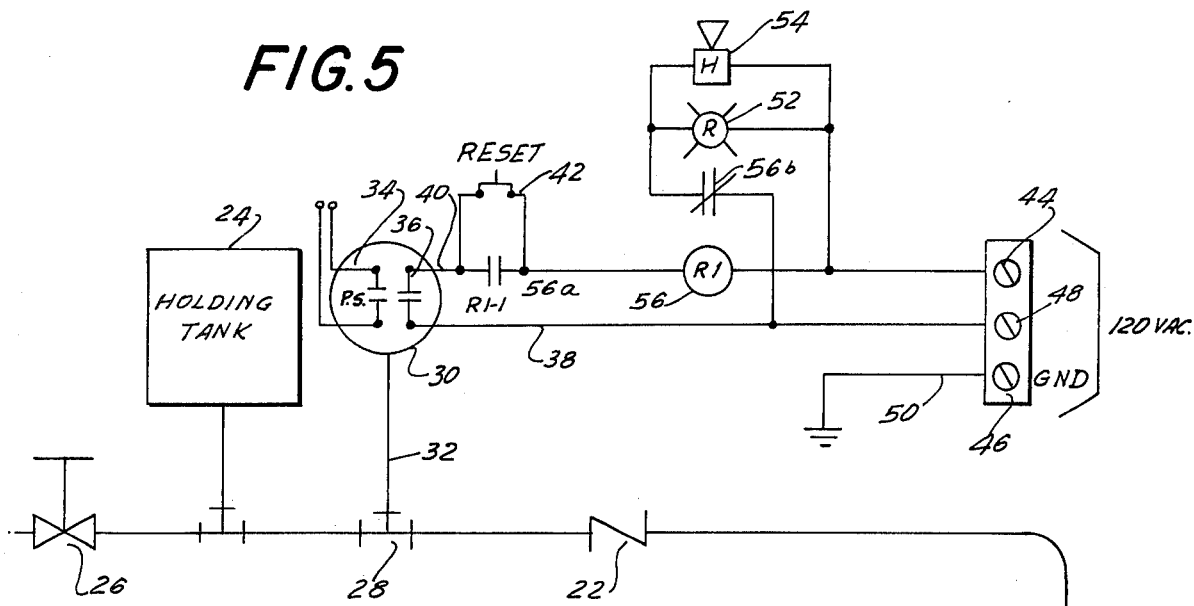
FIG. 5 is a schematic of the detector system.
Figure 5A:
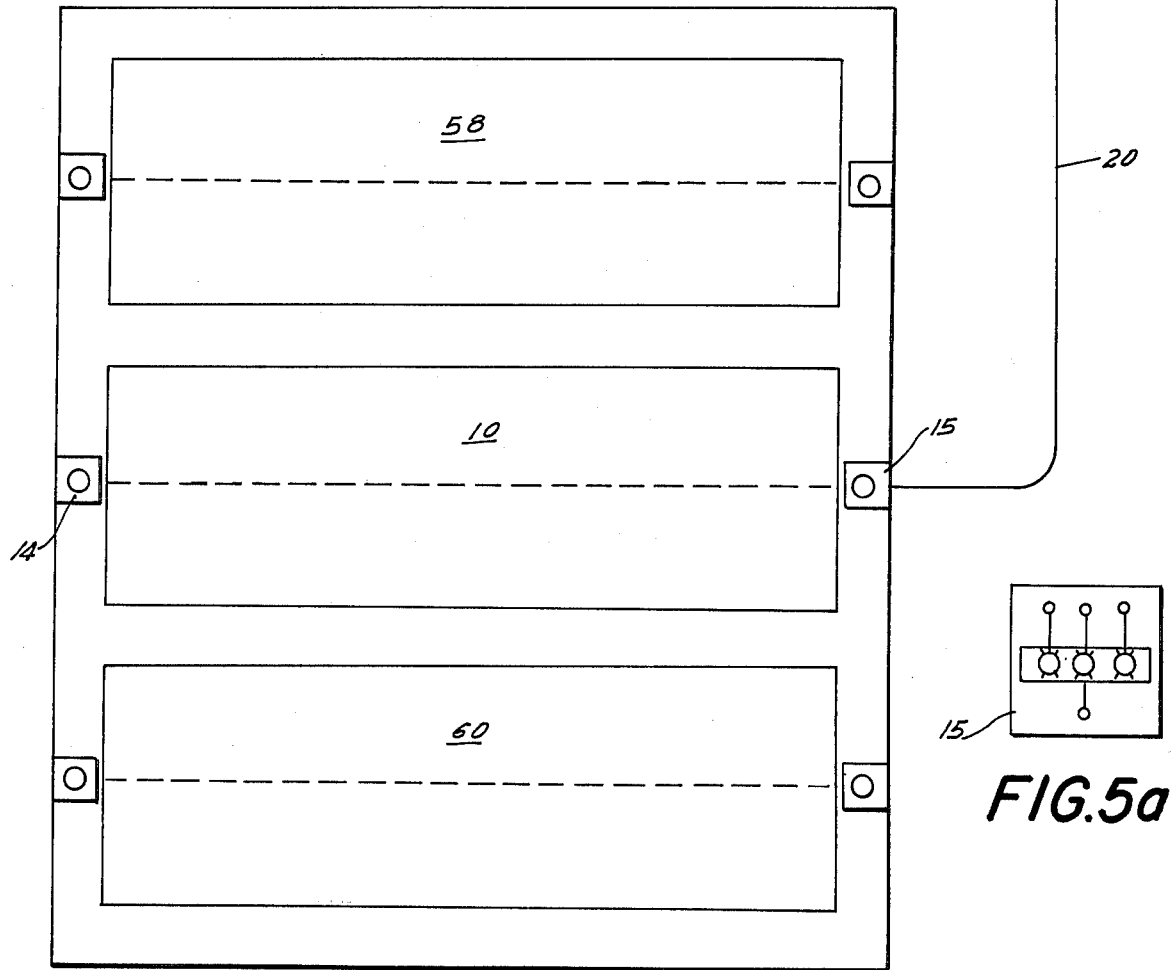
FIG. 5a is an enlarged view of a connection area shown in the schematic.

In FIG. 5 additional tanks 58 and 60 are shown by way of example and illustration and in FIG. 5a the junction box 15 is illustrated showing how tanks 10, 58 and 60 may be included in the system. The description which follows considers only tank 10. When the power is switched on or applied at connector 46 between contacts 44 and 48 light 52 will become energized and horn 54 activated. This is to provide a warning and the light will remain on and the horn will remain activated until relay 56 is energized.

If the system is pressurized to the desired pressure by means of a compressor or other pressurized container via valve 26 the contacts in the pressure switch 30 will be closed and will remain closed until the pressure drops below the necessary level which will happen with valve open only if a leak develops or there is damage in the system.

With the contacts on the pressure switch closed relay 56 can be energized by depressing push-button 42. When relay 56 is energized its associated contacts 56a and 56b change positions. That is to say, that contact 56a which is normally open, closes and contact 56b which is normally closed, opens. When contact 56a closes it seals in relay 56 and push-button 42 can be released. This is a form of interlock system. When contact 56b opens the warning light and the horn which are in electrical series therewith become deactivated.

The system is now in its pressurized condition.

If a leak develops in tank 10 the liquid in the tank will come in contact with hose 12 which is formed of a material which will be destroyed upon contact with the contents of tank 10, thereby exposing the interior of hose 12 to atmosphere or surrounding pressure. The pressure in the system will thereby be released since line 20 will become depressurized, the pressure will drop, the contacts and the pressure switch 30 will open, relay 56 will become deenergized and its associated contacts will change position, with contact 56a opening and contact 56b closing. Accordingly the warning light 52 will come on and horn 54 will sound. In this condition the problem in the system must be corrected or the system shut down in order to denergize light 52 and horn 54. After the system has been repaired, the hose 12 which was destroyed or damaged in whole or in part by the leakage can be replaced and the remainder of the system is operative and undamaged.

I claim:

1. A detector system for monitoring material such as liquids, vapors and gas comprising a tank containing said material, a first hose in operative association with said tank, said hose being sensitive to said material whereby contact therewith renders the interior of said hose open to atmosphere, an alarm system, a pressurized second hose of said alarm system in normally operating condition, an alarm responsive to depressurization of said second hose, said first hose being in operative association with said second hose whereby exposure of the interior of said first hose to atmosphere results in the depressurization of said second hose and activation of said alarm.

\* \* \* \* \*